United States Patent
Vaidyan et al.

(10) Patent No.: US 9,158,663 B2
(45) Date of Patent: Oct. 13, 2015

(54) EVALUATING PERFORMANCE MATURITY LEVEL OF AN APPLICATION

(71) Applicant: TATA CONSULTANCY SERVICES LIMITED, Mumbai, Maharashtra (IN)

(72) Inventors: Koshy P Vaidyan Koshy Vaidyan, Kakkanad (IN); Rajiv Thanawala, Powai (IN); Sreejith Balakrishnan, Kakkanad (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 154 days.

(21) Appl. No.: 13/785,598

(22) Filed: Mar. 5, 2013

(65) Prior Publication Data

US 2014/0201714 A1    Jul. 17, 2014

(30) Foreign Application Priority Data

Jan. 11, 2013    (IN) ............................ 104/MUM/2013

(51) Int. Cl.
*G06F 11/36* (2006.01)
*G06F 11/34* (2006.01)

(52) U.S. Cl.
CPC ........ *G06F 11/3668* (2013.01); *G06F 11/3466* (2013.01); *G06F 11/3672* (2013.01)

(58) Field of Classification Search
None
See application file for complete search history.

(56) References Cited

U.S. PATENT DOCUMENTS

| | | | | |
|---|---|---|---|---|
| 7,788,632 B2 * | 8/2010 | Kuester et al. | ................ | 717/100 |
| 7,805,706 B1 * | 9/2010 | Ly et al. | ........................ | 717/121 |
| 8,171,459 B2 * | 5/2012 | Oja et al. | ....................... | 717/126 |
| 8,739,143 B2 * | 5/2014 | Lafrance-Linden | .......... | 717/154 |
| 8,869,116 B2 * | 10/2014 | Fliek et al. | .................. | 717/125 |
| 2003/0070157 A1 * | 4/2003 | Adams et al. | ................ | 717/101 |
| 2007/0006161 A1 * | 1/2007 | Kuester et al. | ................ | 717/126 |
| 2008/0184209 A1 * | 7/2008 | LaFrance-Linden | ......... | 717/130 |
| 2009/0037893 A1 * | 2/2009 | Brodsky et al. | ............... | 717/154 |
| 2009/0138856 A1 * | 5/2009 | Oja et al. | ....................... | 717/126 |
| 2010/0162200 A1 * | 6/2010 | Kamiyama et al. | ........... | 717/101 |
| 2011/0066893 A1 * | 3/2011 | Bassin et al. | ................. | 714/38.1 |

OTHER PUBLICATIONS

Koziolek, Heiko. "Performance evaluation of component-based software systems: A survey." Performance Evaluation 67.8 (2010): 634-658.Retrieved on [Aug. 6, 2015] Retrieved from the Internet: URL<http://www.sciencedirect.com/science/article/pii/S016653160900100X#>.*

(Continued)

*Primary Examiner* — Thuy Dao
*Assistant Examiner* — Cheneca Smith
(74) *Attorney, Agent, or Firm* — Barnes & Thornburg LLP

(57) ABSTRACT

Systems and methods for evaluating a performance maturity level of a software application are described herein. In an implementation, the method includes obtaining at least one assessment parameter and at least one sub-parameter of the at least one assessment parameter, based on at least one of a key performance area and a key competency area. Further, a weightage is assigned to the at least one sub-parameter, the weightage being based on significance of the at least one sub-parameter to the assessment parameter. In addition, a performance questionnaire is configured, based on the at least one assessment parameter and the at least one sub-parameter. Subsequently, a maturity score is determined for the software application, in response to inputs to the performance questionnaire, the maturity score being indicative of the performance maturity level of the software application.

10 Claims, 3 Drawing Sheets

(56) References Cited

OTHER PUBLICATIONS

Balsamo, Simonetta, et al. "Model-based performance prediction in software development: A survey." Software Engineering, IEEE Transactions on 30.5 (2004): 295-310.Retrieved on [Aug. 6, 2015] Retrieved from the Internet: URL<http://ieeexplore.ieee.org/xpls/abs_all.jsp?arnumber=1291833&tag=1>.*

Ahmed et al.; A business maturity model of software product line engineering; Inf Syst Front; 2011; pp. 543-560; vol. 13; Published (online) Mar. 19, 2010.

Doddavula et al.: A Maturity Model for Application Performance Management Process Evolution; SOA World; Jun. 23, 2011.

Maddox; A Performance Process Maturity Model; Jun. 2005.

* cited by examiner

EVALUATING PERFORMANCE MATURITY LEVEL OF AN APPLICATION

PRIORITY CLAIM

This patent application claims priority to Indian Patent Application No. 104/MUM/2013, filed 11 Jan. 2013, the disclosure of which is incorporated herein by references in its entirety.

TECHNICAL FIELD

The present subject matter, in general, relates to application development and deployment and, particularly but not exclusively, to evaluating performance maturity level of an application.

BACKGROUND

With the onset of automation in almost every walk of life, software applications have replaced tedious human labour in almost all avenues. For example, applications are developed and implemented for carrying out monetary transactions, accounting, travel booking, hotel management, cab management, and a plethora of other such purposes.

Subsequently, upon deployment of the software application, such application is typically accessed by many users concurrently. The volumes of data created or searched on the software application can grow to millions or billions of records. Accordingly, the software applications are tested to ensure that the software performs the functions it is designed for. Software applications are tested for functionality, bugs, and glitches in order to determine whether the software applications meet required goals or not. Several methods have been conventionally devised to monitor and improve the performance of a software application. In order to consider the rapid changes that occur in the technology landscape, such conventional techniques usually take into account the functional aspects of application development and deployment.

SUMMARY OF THE INVENTION

This summary is provided to introduce concepts related to evaluation of performance maturity level of an application, and the concepts are further described below in the detailed description. This summary is not intended to identify essential features of the claimed subject matter nor is it intended for use in determining or limiting the scope of the claimed subject matter.

Systems and methods for evaluating a performance maturity level of a software application are described herein. In an implementation, the method includes obtaining at least one assessment parameter and at least one sub-parameter of the at least one assessment parameter, based on at least one of a key performance area and a key competency area. Further, a weightage is assigned to the at least one sub-parameter, the weightage being based on significance of the at least one sub-parameter to the assessment parameter. In addition, a performance questionnaire is configured, based on the at least one assessment parameter and the at least one sub-parameter. Subsequently, a maturity score is determined for the software application, in response to inputs received to the performance questionnaire by a stake holder associated with the software application. The determining is based on the weightage assigned to the at least one sub-parameter of the at least one assessment parameter. Further, the maturity score is indicative of the performance maturity level of the software application.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
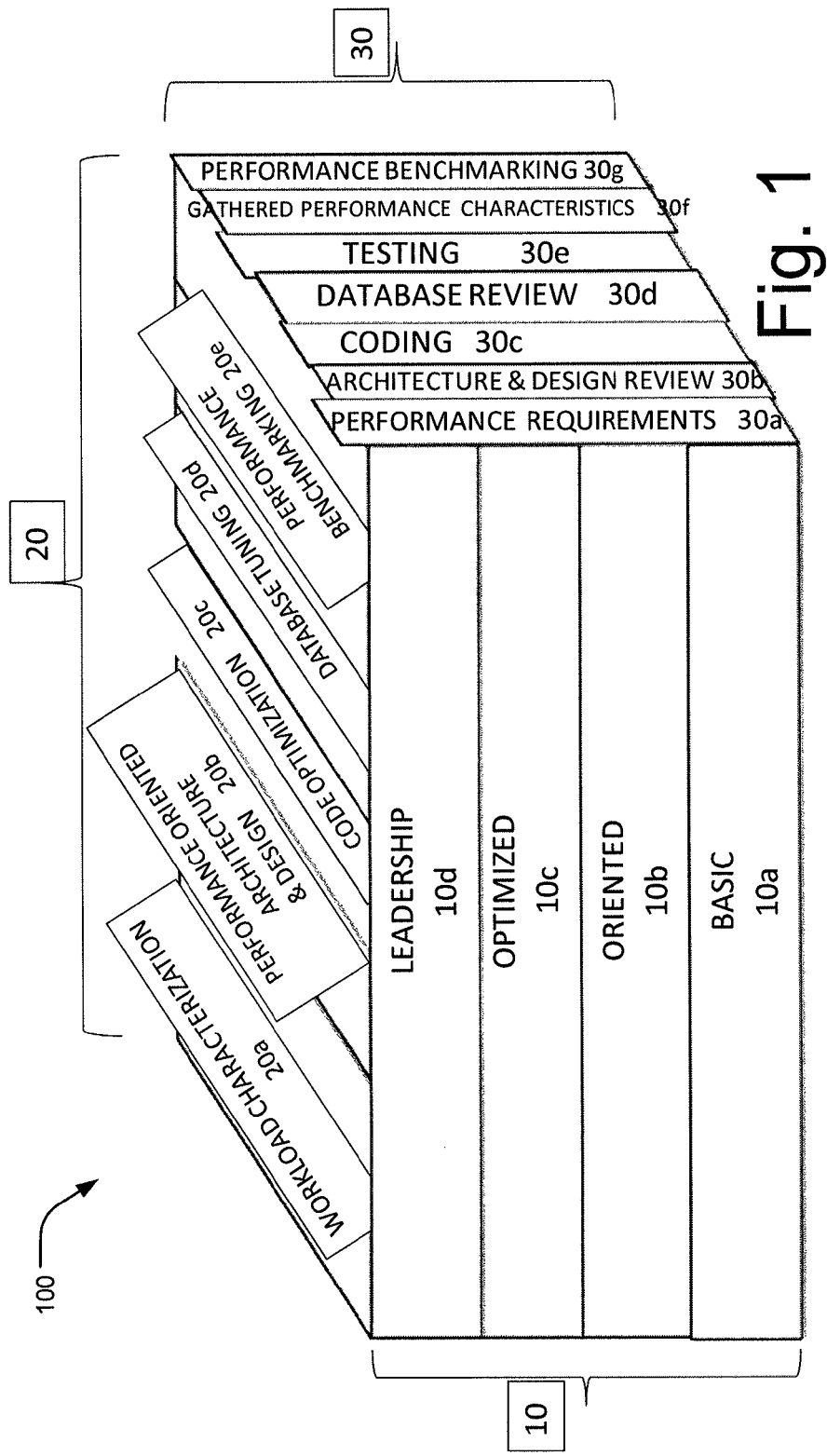
FIG. 1 illustrates a schematic view of an application performance maturity evaluation model, according to an implementation of the present subject matter.

System(s) and method(s) for assessment of performance maturity level of an application are described herein Conventionally, various techniques are available for assessing the performance of a software application. However, none of the techniques assess maturity of overall performance of the software application. As a result, the conventional techniques of performance assessment fall short of assessing the overall performance of the software application, and are unable to provide a complete and elaborate viewpoint on the software application. As a result, the software application developed henceforth lacks the performance capabilities that may be expected by the user of the software application.

The present subject matter describes systems and methods for evaluating performance maturity level of a software application, according to an embodiment of the present subject matter. According to an aspect, the evaluation of the performance maturity level of the software application is achieved based on an application performance maturity evaluation model. Accordingly, in an embodiment, the application performance maturity evaluation model is implemented in the system and the method described herein.

According to an aspect, the present subject matter provides to build a performance maturity scale along with a measurement mode, and a process for assessing performance of a software product. The present subject matter can include four maturity levels, namely, basic, oriented, optimized, and leadership, and, in an implementation, can be derived from previously identified key performance areas. In an example, the key performance areas can include workload characterization, performance oriented architecture and designing, code optimization, database tuning, and performance benchmarking. The present subject matter, therefore, provides a systematic approach to assess performance maturity level of a software product.

In an implementation of the present subject matter, the assessment of the performance maturity level of the software application can include assessing the performance maturity level based on a plurality of assessment parameters. The plurality of assessment parameters can, in turn be determined based on the key performance areas as mentioned above. In addition, in an example, for the above mentioned key performance areas, the assessment parameters can include seven parameters, based on seven key competency areas, namely, performance requirements, performance-based architecture and design review, coding, database review, testing, performance benchmarking, and gathered performance characteristics. In one implementation, the above assessment parameters can be provided in the form of an exhaustive checklist based on which the performance maturity assessment can be achieved. During the assessment of the software application, the answers relevant to each of the sub-parameters can be populated, based on which the performance maturity level of the software application can be determined.

In an implementation, the plurality of assessment parameters and sub-parameters are obtained based on the software application. In an example, each assessment parameter can have a plurality of sub-parameters associated therewith. Further, in said implementation, a weightage is provided to each of the assessment parameters. In said implementation, each sub-parameter in each assessment parameter is assigned a weightage, the weightage being based on significance of the sub-parameter to the relevant assessment parameter or the key performance area. In an implementation, the weightage can be associated with each assessment parameter and the sub-parameter, based on, for example, the significance or relevance of the respective assessment parameter and sub-parameter, by the system. In another implementation, the weightage associated with each assessment parameter and sub-parameter, can be retrieved from previously stored weightages. In an example, the weightages can be based on the historical weightages associated with such assessment parameters, or can be provided by a user.

Subsequently, a performance questionnaire can be configured, based on the obtained assessment parameters and the sub-parameters. The performance questionnaire can be configured, in an implementation, by retrieving previously stored questions relevant to the obtained assessment parameters and the sub-parameters. The performance questionnaire can be provided to a stake holder associated with the software application being checked for performance maturity. In an implementation, in certain cases, for example, in case the stake holder requests, an auxiliary questionnaire including questions relating to system performance can be configured and provided in addition to the performance questionnaire. Such questions relating to system performance can include, for example, questions relating to CPU (central processing unit) utilization and memory utilization by the software application.

Subsequently, inputs can be received, say from the stake holder, in response to the performance questionnaire. The inputs can be analyzed to determine an evaluation score associated with each response for the sub-parameters, and subsequently, for each assessment parameter. In an example, a maturity rating for each sub-parameter can be determined, and based on the evaluation ratings of the respective sub-parameters and the weightages associated with each sub-parameter, the evaluation score for each sub-parameter and assessment parameter can be determined.

Further, based on the evaluation score for the assessment parameters, a maturity score for that software application can be determined. The maturity score is indicative of the maturity level of the software application. As mentioned above, the evaluation score for each of the sub-parameter and for each assessment parameter is based on the weightage and the maturity level is evaluated based on the evaluation score derived for the assessment parameters. Therefore, as will be understood, the maturity score so determined will take into account the weightages given to the assessment parameters and sub-parameters. In an example, the evaluation scores can be provided by an assessor based on the evaluation ratings and the weightages.

In addition, a feedback can be provided on the maturity level of the software application. In case a target performance maturity level of the software application, say previously received from the stake holder, is not met, then suggestions for improving the performance maturity of the software application can be provided.

The present subject matter provides a simple and effective mechanism to track performance maturity and improvement of a software application, irrespective of the programming technology used. Therefore, the present subject matter can be implemented across various platforms. Further, the present subject matter provides for a single mechanism that covers performance aspects required in various phases of software development life cycle. In addition, different types of suggestions can be provided for different levels of the development life cycle, for the different personnel associated with a certain phase.

For example, the software application can be checked for performance maturity according to the present subject matter and suggestions provided to application developers, technical leads and software architects for addressing performance issues. In said example, in addition, for managers, the assessment score can be provided to identify the phase of the development life cycle where performance is not addressed appropriately. Therefore, for any unit developing multiple software applications or products, the present subject matter provides for a single mechanism for tracking performance maturity of all of the software applications at different stages.

In addition, the present subject matter provides for benchmarking and comparing the software application against existing software applications which are already established to be well-performing applications. Therefore, the present subject matter encourages the enhancement of the performance of the software applications or products being developed, by comparing them with established well-performing product. The software applications are said to have achieved the highest level, i.e., the fourth level called the leadership level when it is determined to be achieving a superior performance perspective in comparison to other software products operating with similar functionality.

These and other advantages of the present subject matter would be described in greater detail in conjunction with the following figures. While aspects of described system(s) and method(s) for evaluating performance maturity level of an application can be implemented in any number of different computing systems, environments, and/or configurations, the embodiments are described in the context of the following exemplary system(s).

FIG. 1 illustrates a schematic view of an application performance maturity evaluation model 100, hereinafter referred to as evaluation model 100, according to an implementation of the present subject matter. According to an aspect, the purpose of the evaluation model 100 is to establish the performance maturity level of a software application. In an example, the assessment of the maturity of the software application can be based on four performance maturity levels 10, namely, basic 10a, oriented 10b, optimized 10c, and leadership 10d. Further, the evaluation model 100 includes analyzing where exactly the software application falls in the four performance maturity levels 10. The performance maturity levels 10 are described as below.

The basic level 10a of performance maturity indicates that for the software application under consideration, performance testing is done to check if the performance criteria of the software application that would be acceptable to the end users, are met or not. For the software application to fall in the basic performance maturity level 10a, all aspects of performance testing have to be fully satisfied by the software application.

The second level of the performance maturity levels, referred to as the oriented level 10b, for the software application under consideration, code optimization and database tuning are carried out to enhance the overall performance of the software product. For the software application to be fall within this level 10b, all aspects of database and code optimization have to be fully satisfied, in addition to meeting the criteria for the basic level 10a as stated above.

The next level in the hierarchy of the maturity levels is referred to as optimized level 10c of performance maturity. For the software application to fall within the optimized level 10c, architecture and design of the software application have to be performed as per the performance requirements. In addition, it is also determined that the design principles and design patterns suited to performance are also incorporated in the software application.

In addition, for determining whether the software application falls within the optimized level 10c, the evaluation model 100 can provide for incorporating performance controls. Further, performance testing of the software application must have also been carried out in order to ensure optimal performance. Therefore, for the software application to fall within this performance maturity level 10c, all aspects of architecture, design, and gathering of architecture and design requirements have to be fully satisfied, in addition to meeting the criteria for oriented level 10b (and, as will be understood, the basic level 10a).

The next level of maturity, and the highest level of performance maturity in the hierarchy, in said implementation, is referred to as the leadership level 10d. For the software application to fall in the leadership level 10d, the software application has to be benchmarked against the industry standards and should be considered as a leader in the similar category of software applications. In addition, the software application should be undergoing continuous improvement with respect to the performance. As will be understood, for the software application to be at this performance maturity level 10d, the criteria for the aforementioned levels 10a, 10b, and 10c should also be met, in addition to the ones described above with reference to this performance maturity level 10d.

In addition, according to an aspect, the evaluation model 100 incorporates predefined assessment parameters 30, which indicate key competence areas, and the performance maturity level 10 of the software application is measured with respect to these assessment parameters 30 or the key competency areas. In an example, these assessment parameters 30 can include performance requirements 30a, performance-based architecture and design review 30b, coding 30c, database review 30d, testing 30e, gathered performance characteristics 30f, and performance benchmarking 30g.

Further, according to an implementation, the assessment of the performance maturity level 10 using the evaluation model 100 can also be achieved with respect to a plurality of key performance areas 20. These key performance areas 20 can include workload characterization 20a, performance oriented architecture and design 20b, code optimization 20c, database tuning 20d, and performance benchmarking 20e. As will be understood, in other examples, the assessment parameters 30 can be derived based on the key performance areas 20, and can be combined with the key performance areas 20 to arrive at the final set of assessment parameters 30.

According to an implementation, in addition to measuring performance maturity level 10, the evaluation model 100 can provide for the identification of the steps which can be implemented to improve the performance maturity level 10 of the software application, in case the software application does not comply with a predefined maturity level.

A relational mapping between key performance areas 20 and the performance maturity levels 10 that form a basis for measuring performance maturity of the software application according to an implementation of the present subject matter, is illustrated as an example in Table 1 below:

TABLE 1

| Key Performance Areas | Basic | Oriented | Optimized | Leadership |
|---|---|---|---|---|
| Workload Characterization | There is no specific focus on work load characterization at this level. | There is no specific focus on work load characterization at this level. | The process and templates for performance requirements capture and work load characterization is in place. The team is trained on these activities. | The industry standards for product performance benchmarking are available. The process and templates for performance requirements capture and work load characterization is in place. The team is trained on these activities. |
| Performance Oriented Architecture and Design | There is no specific focus on architecture/ design at this level. | There is no specific focus on architecture/ design at this level. | The performance requirements are captured. The performance requirements are broken to the technology component level. The architecture and design suited for performance is identified. The design patterns and principles suited for performance are identified. The team is trained on performing these activities. | Architecture and Technology benchmarked from a performance perspective is identified. The design principles and patterns suited for performance are identified. The team is trained on these aspects. |

TABLE 1-continued

| Key Performance Areas | Basic | Oriented | Optimized | Leadership |
|---|---|---|---|---|
| Code Optimization | There is no specific focus on code optimization at this level. | The focus is to ensure optimal code optimization is carried out. The guidelines for the same are available. The team is trained on these guidelines. | Code Optimization and profiling is done. The guidelines for the same are available and the team is trained on these aspects. | Code Optimization and profiling is done. The guidelines for the same are available and the team has the capability to carry out these activities. The results are benchmarked. |
| Database Tuning | There is no specific focus on database tuning at this level | Database tuning is carried out. The guidelines for performing the same are available. The team is familiar with these aspects. | The database design is optimized from a performance perspective. Database tuning is carried out. The process and tools for carrying out these activities are available and the team has the capability to perform these activities. | The database design is optimized, tuning is carried out and the results are benchmarked. The process and tools for carrying out these activities are available and the team has the capability to perform these activities. |
| Performance Benchmarking | The process and tools for performance testing and analysis of performance test results is in place. The team has the capability to carry out the same. | The process and tools for performance testing and analysis of performance test results is in place. The team has the capability to carry out the same. The performance bottlenecks are identified from coding and database perspective and the issues are fixed. Subsequent iterations of testing are conducted to arrive at the benchmark values. | The process and tools for performance testing and analysis of performance test results is in place. The team has the capability to carry out the same. The performance bottlenecks are identified from architecture/design, coding and database perspective and the issues are fixed. Subsequent iterations of testing are conducted to arrive at the benchmark values. | The process and tools for performance benchmarking is in place. The team has the capability to carry out the same. Performance benchmarking against industry standards is performed. |

Further, the evaluation model 100 is implemented in a performance evaluation system, according to an implementation of the present subject matter. In said implementation, the performance evaluation system can be configured to evaluate the performance maturity level 10 of the software application, based on the evaluation model 100. The performance evaluation system is described in detail with reference to FIG. 2.

Figure 2:
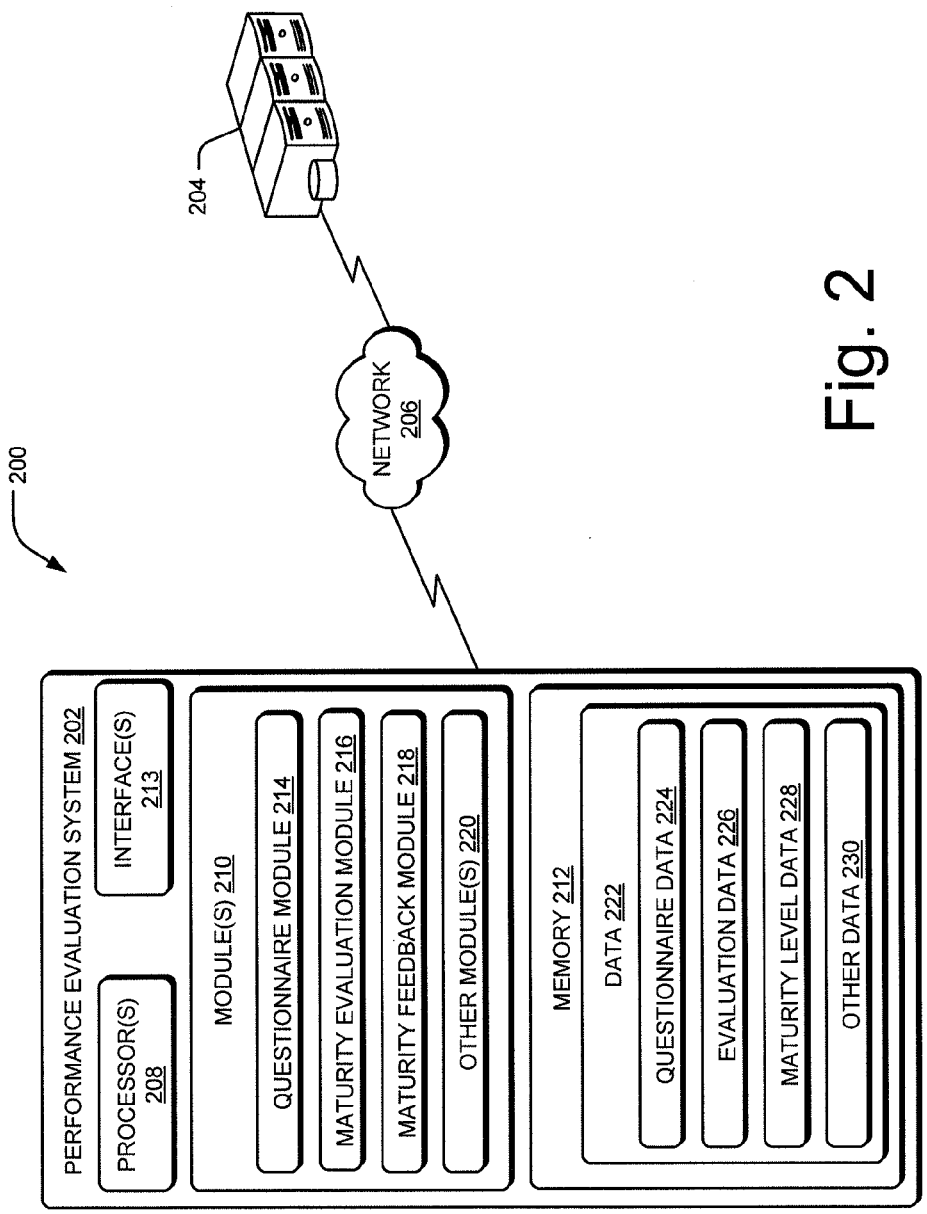
FIG. 2 illustrates a network environment implementing a performance evaluation system which further implements the application performance maturity evaluation model of FIG. 1, for evaluating performance maturity level of an application, according to an embodiment of the present subject matter.

FIG. 2 illustrates a network environment 200 implementing a performance evaluation system 202, according to an embodiment of the present subject matter. In said embodiment, the performance evaluation system 202 is connected to and interacts with a client system 204. The performance evaluation system 202 may be implemented as any of a variety of computing devices, including, for example, servers, a desktop PC, a notebook or portable computer, a workstation, a mainframe computer, a mobile computing device, and an internet appliance.

The client system 204 can be understood as a system implemented at the client end at which the application is deployed for which the performance maturity is to be determined. The application can be deployed at the client end to achieve various functionalities depending on the type of establishment that the application is deployed at. For example, the application may be used for accounting, book-keeping, customer relationship management (CRM), enterprise resource planning (ERP), and transactions, at banks and other financial institutions. In another example, the application can be an entertainment application, say a music application or a web application. The client system 204 may include, without limitation, servers, desktop computers, hand-held devices, laptops or other portable computers, network computers, mobile phones, multi-media enabled phones, or smart phones.

The performance evaluation system 202 is connected to the client system 204 over a network 206 through one or more communication links. The communication links between the performance evaluation system 202 and the client system 204 are enabled through a desired form of communication, for example, via dial-up modem connections, cable links, digital subscriber lines (DSL), wireless or satellite links, or any other suitable form of communication.

The network 206 may be a wireless network, wired network or a combination thereof. The network 206 can be implemented as one of the different types of networks, such as intranet, local area network (LAN), wide area network (WAN), the internet, and such. The network 206 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 206 may include a variety of network devices, including routers, bridges, servers, computing devices, storage devices.

In one implementation, the performance evaluation system 202 can include processor(s) 208 coupled to modules 210 and memory 212. The performance evaluation system 202 further includes interface(s) 213, for example, to facilitate communication with the client system 204. The interface(s) 213 may include a variety of software and hardware interfaces, for example, a web interface and a graphical user interface. Further, the interface(s) 213 may enable the performance evaluation system 202 to communicate with other computing devices, such as web servers and external data servers (not shown in figure). The interface(s) 213 can facilitate multiple communications within a wide variety of networks and protocol types, including wired networks, for example LAN, cable, and wireless networks such as WLAN, cellular, or satellite. The interface(s) 213 may include one or more ports for connecting the performance evaluation system 202 to a number of devices to or to another server.

The processor(s) 208 may be implemented as one or more microprocessors, microcomputers, microcontrollers, digital signal processors, central processing units, state machines, logic circuitries, and/or any devices that manipulate signals based on operational instructions. Among other capabilities, the processor(s) 208 is configured to fetch and execute computer-readable instructions.

The module(s) 210 can include routines, programs, objects, components, data structures, etc., which perform particular tasks or implement particular abstract data types. In another implementation, the module(s) 210 may be implemented as, signal processor(s), state machines, logic circuitries, and/or any devices or components that manipulate signals based on operational instructions. In an implementation, the module(s) 210 include, for example, a questionnaire module 214, a maturity evaluation module 216, a maturity feedback module 218, and other module(s) 220. The other module(s) 220 can supplement applications or functions performed by the performance evaluation module 202.

Further, the memory 212 of the performance may include any non-transitory computer-readable medium known in the art including, for example, volatile memory, such as Static Random Access Memory (SRAM), Dynamic Random Access Memory (DRAM), etc., and/or non-volatile memory, such as Erasable Program Read Only Memory (EPROM), and flash memory. The non-transitory computer-readable medium, however, excludes a transitory, propagating signal. The memory 212 can further include data 222.

The data 222 can include questionnaire data 224, evaluation data 226, maturity level data 228, and other data 230. The other data 230, amongst other things, may serve as a repository for storing data that is processed, received, or generated as a result of the execution of one or more modules in the module(s) 210. Although the data 222 is shown internal to the performance evaluation system 202, it may be understood that the data 222 can reside in an external repository, which may be coupled to the performance evaluation system 202. The performance evaluation system 202 may communicate with the external repository through the interface(s) 213 to obtain information from the data 222.

During operation, the performance evaluation system 202 is configured to communicate with the client system 204 and achieve the evaluation of the performance maturity for the application hosted on the client system 204. According to an implementation, the questionnaire module 214 is configured to obtain a plurality of assessment parameters 30 and sub-parameters, based on the software application. As mentioned previously, the assessment parameters 30 and the sub-parameters can be directly based on the key competency areas described previously. Further, according to an aspect, the assessment parameters 30 and the sub-parameters can be derived based on the key performance areas 20. The assessment parameters 30 and the sub-parameters can be retrieved from the questionnaire data 224, where such parameters 30 are previously stored.

In addition, the questionnaire module 214 can be configured to associate a weightage with each assessment parameter 30 and sub-parameter. In an implementation, the questionnaire module 214 can associate the weightage with each assessment parameter and the sub-parameter, based on, for example, the significance or relevance of the respective assessment parameter 30 and sub-parameter. In another implementation, the questionnaire module 214 can retrieve the weightage associated with each assessment parameter 30 and sub-parameter, stored previously in the questionnaire data 224. In an example, the weightages can be based on the historical weightages associated with such assessment parameters 30, or can be provided by a user of the performance evaluation system 202.

Once the assessment parameters 30 and the sub-parameters and their respective weightages have been obtained, the questionnaire module 214 can further configure a performance questionnaire, based on the obtained assessment parameters 30 and the sub-parameters. The performance questionnaire can be configured, in an implementation, by retrieving previously stored questions relevant to the obtained assessment parameters 30 and the sub-parameters, in the questionnaire data 224.

The maturity evaluation module 216 can, subsequently, provide the performance questionnaire to a stake holder associated with the software application being checked for performance maturity. In an example, the stake holder can be administrator overseeing the operation of the software application on the client system 204, at the client end. In an implementation, in certain cases, for example, in case the stake holder requests, the maturity evaluation module 216 can prompt the questionnaire module 214 to configure an auxiliary questionnaire including questions relating to system performance. Such questions relating to system performance can include, for example, questions relating to CPU (central processing unit) utilization and memory utilization by the software application.

In an implementation, the performance questionnaire and the auxiliary questionnaire can include selectable answers, for example, provided in drop-down format. Accordingly, the stake holder, while responding to the questionnaires, can select one of the many options for each question.

Subsequently, the maturity evaluation module 216 can receive inputs, say from the stake holder, in response to the performance questionnaire. The inputs can be stored in the evaluation data 226. Further, the maturity evaluation module 216 can analyze the inputs to determine an evaluation score associated with each response for each assessment parameter 30. In an example, the maturity evaluation module 216 can determine a maturity rating for each sub-parameter, and based on the maturity ratings of the respective sub-parameters and the weightages associated with each sub-parameter, the maturity evaluation module 216 can determine the evaluation score for each assessment parameter. In an implementation, the maturity evaluation module 216 can compare the responses with previously stored responses in the evaluation data 226 to determine the evaluation score associated with each assessment parameter 30.

Further, once the maturity evaluation module 216 has determined the evaluation ratings and evaluation scores associated with each response, the maturity evaluation module 216 can determine an overall maturity score for the software application, based on the evaluation score of the assessment parameters. As will be understood from the foregoing description, the maturity score determined for the software application is based on the evaluation ratings and evaluation scores of the individual responses and the weightage associated with each question, as described above. As will be understood that the weightage associated with each question correspond to the weightage associated with the assessment parameter 30 or sub-parameter to which the question relates. The maturity score of the software application so determined can be indicative of the performance maturity level 10 of the software application.

In addition, the performance evaluation system 202 can be configured to obtain a feedback on the maturity level of the software application. In case an expected performance maturity level 10 of the software application, say previously received from the stake holder, is not met, then the maturity feedback module 218 can provide suggestions for improving the performance maturity of the software application. Such suggestions can be stored in the maturity level data 228.

The above mentioned operation of the performance evaluation system 202 is further explained with the help of the following example. Accordingly, referring to Table 2, an example of the weightages being assigned to each of the assessment parameters 30 and sub-parameters is illustrated. In said example, the questionnaire module 214 assigns a weightage of 6 to the sub-parameter "check if performance requirements are completely gathered" for the performance requirements 30*a* assessment parameter, such sub-parameter being an important aspect of the performance requirements 30*a*. Likewise, for the assessment parameter of architecture and design review 30*b*, the sub-parameter 'check if design review has been conducted and the recommendations incorporated' has been assigned a weightage of 5, since this sub-parameter is an important aspect for the assessment parameter of architecture and design review 30*b*. Similarly, the sub-parameter 'check if work load characteristics are done correctly', for the assessment parameter of testing 30*e*, a weightage of 4 is assigned, and so on. As will be understood that the evaluation score given to the sub-parameters are based on the weightages described above.

Further, the evaluation rating for each sub-parameter of the assessment parameters 30 is evaluated as shown in table 2. Further, an evaluation score of each sub-parameter can be determined for each sub-parameter, based on the evaluation rating. In an example, the maturity evaluation module 216 can be configured to associate the evaluation rating with each sub-parameter based on whether the sub-parameter 'Meets the expectation' or 'Did not meet the expectation'. Accordingly, an evaluation score of '1' is assigned to the sub-parameter if the sub-parameter 'Meets the expectation'. Similarly, if the sub-parameter 'Does not meet the expectation', then an evaluation score of '0' is assigned to the same. Further, the maturity evaluation module 216 can also be configured to handle such a scenario in which a particular sub-parameter is 'Not applicable' for assessing the performance maturity level 10. In such cases, if the sub-parameter is 'Not applicable', an evaluation score of '1' is assigned to such a sub-parameter.

Further, based on the evaluation score and the weightage of each sub-parameter, the evaluation score for each assessment parameter 30 is determined to assess the performance maturity. In an implementation, as described above, for determining the respective evaluation scores, the maturity evaluation module 216 can take into account the weightage assigned to each sub-parameter. For example, the sub-parameter 'To check if performance requirements are completely gathered' for performance requirement 30*a* assessment parameter has been assigned a weightage of 6, and if this sub-parameter 'Meets the expectation' the evaluation score for the question associated with this sub-parameter would be 6 (6×1). On the contrary, for the same sub-parameter, if the software application 'Does not meet the expectation, the evaluation score for the sub-parameter would be 0 (6×0). As mentioned previously, to conduct the evaluation based on the assessment parameters 30 and the sub-parameters, an assessor may provide the evaluation score for each response, say from the stake holder, and accordingly, the maturity evaluation module 216 can determine the overall maturity score and the performance maturity level 10 for the software application under consideration.

Further, for assessing the assessment parameter of gathered performance characteristics 30*f*, the sub-parameters can include response time, CPU utilization, memory utilization and no. of concurrent users, to analyze the performance maturity of the software product, and based on the performance parameters as can be seen in Table 2. As mentioned previously, such assessment parameters can alternately be provided in the auxiliary questionnaire.

TABLE 2

| Sl. No | Checklist Items | Weightage | Response (0—Does not meet the expectation, 1—Meets the expectation 1—Not applicable) | Evaluation score | Evaluation score for Assessment parameter |
|---|---|---|---|---|---|
| | Performance requirements (R) | | | | |
| 1 | Check whether Performance Requirements are gathered completely | 6 | Meets the expectation | 1 | 6 |

TABLE 2-continued

| Sl. No | Checklist Items | Weightage | Response (0—Does not meet the expectation, 1—Meets the expectation 1—Not applicable) | Evaluation score | Evaluation score for Assessment parameter |
|---|---|---|---|---|---|
| 2 | Check whether Performance Acceptance Criteria is defined correctly | 4 | Meets the expectation | 1 | 4 |
| 3 | Check whether Performance requirements gathered are agreed by all the stake holders | 5 | Meets the expectation | 1 | 5 |
| | | | | Evaluation score | 15 |
| | Architecture and Design Review (A) | | | | |
| 1 | Check whether performance based design patterns are implemented | 3 | Meets the expectation | 1 | 3 |
| 2 | Is the architecture in line with the technology vendors' published guidance and roadmap? | 3 | Does not meet the expectation | 0 | 0 |
| 3 | Check whether performance design principles are implemented | 3 | Meets the expectation | 1 | 3 |
| 4 | Check whether design review has been conducted and the recommendations incorporated | 5 | Does not meet the expectation | 0 | 0 |
| | | | | Evaluation score | 6 |
| | Coding (C) | | | | |
| 1 | Check whether coding guidelines are available and is followed | 4 | Meets the expectation | 1 | 4 |
| 2 | Check whether code profiling is done and tuning has been done | 4 | Meets the expectation | 1 | 4 |
| 3 | Check whether the recommendations are incorporated and there is improvement in the response time of the tuned methods | 4 | Meets the expectation | 1 | 4 |
| | | | | Evaluation score | 12 |
| | Database Review (D) | | | | |
| 1 | Are the database table fields having the right data type, and constraints defined to enforce data integrity? | 2 | Meets the expectation | 1 | 2 |
| 2 | Is the application SQL code tuned? | 2 | Meets the expectation | 1 | 2 |
| 3 | Is the database schema adequately normalized? | 2 | Meets the expectation | 1 | 2 |
| 4 | Is the required level of partitioning done on the DB? | 2 | Not Applicable | 1 | 2 |
| 5 | Are database parameters tuned and customized based on the application and resources available? | 2 | Meets the expectation | 1 | 2 |
| 6 | Are columns occurring frequently in WHERE Clauses, JOIN clauses, in ORDER BY, in GROUP BY, indexed adequately? | 2 | Meets the expectation | 1 | 2 |

TABLE 2-continued

| Sl. No | Checklist Items | Weightage | Response (0—Does not meet the expectation, 1—Meets the expectation 1—Not applicable) | Evaluation score | Evaluation score for Assessment parameter |
|---|---|---|---|---|---|
| 7 | Check whether the database review has been conducted and the recommendations incorporated | 2 | Meets the expectation | 1 | 2 |
| | | | | Evaluation score | 14 |
| | Testing (T) | | | | |
| 1 | Check whether Workload characteristics are done correctly | 4 | Meets the expectation | 1 | 4 |
| 2 | Does the Test Plan/Strategy covers all scenarios for Performance Testing | 3 | Meets the expectation | 1 | 3 |
| 3 | Is the Test Plan/Test Strategy approved by relevant stakeholders | 3 | Meets the expectation | 1 | 3 |
| 4 | Is the test execution done on relevant infrastructure? | 4 | Meets the expectation | 1 | 4 |
| 5 | Verify whether performance acceptance criteria are met | 4 | Meets the expectation | 1 | 4 |
| 6 | Check whether the recommendations based on performance testing has been incorporated | 3 | Meets the expectation | 1 | 3 |
| | | | | Evaluation score | 21 |
| | Performance Benchmark (P) | | | | |
| 1 | Has performance benchmarking against industry Standards performed? | 3 | Meets the expectation | 1 | 3 |
| 2 | Is the Tool/Application/Product accepted as a market leader among the products of similar category? | 2 | Meets the expectation | 1 | 2 |
| | | | | Evaluation score | 5 |
| | Gathered Performance Characteristics (GPC) | | | | |
| 1 | Response Time | 5 | Low | 3 | 7.5 |
| 2 | CPU Utilization ( <80%) | 4 | Yes | 1 | 2 |
| 3 | Memory utilization (<75%) | 3 | Yes | 1 | 1.5 |
| 4 | No. of Concurrent users | 5 | High | 3 | 7.5 |
| | | | | Evaluation score | 19 |

Further, according to another implementation of the present subject matter, the model can include evaluation criteria to evaluate the performance maturity of the software application after obtaining the evaluation scores for each assessment parameter 30.

In said implementation, in order to achieve a particular performance maturity level 10, the software application is required to meet all the assessment parameters 30 of that particular level as well as of all the levels hierarchically below the level to be achieved. Accordingly, the evaluation scores are computed for each assessment parameter and aggregated based on predefined evaluation criteria to determine the performance maturity level 10 of the software application. In order to move from a lower maturity level to a higher maturity level in a hierarchy, all the requirements listed in the lower maturity levels should be met.

The above described implementation including the evaluation criteria to determine the performance maturity level 10 of the software application is illustrated henceforth as an example. According to said example, the software application is evaluated to be at first level, i.e., basic level, when sum of the assessment parameters testing 'T' 30e and gathered performance characteristics 'GPC' 30f is equal to 40. This implies that for the software application to be evaluated as conforming to the first performance maturity level 10, the software application should have full scores for all sub-parameters of the assessment parameters testing 30e and gathered performance characteristics 30f.

Further, the software application is evaluated to be at the second hierarchical level, i.e., the oriented level when the sum of the assessment parameters testing 30e, gathered performance characteristics 30f, coding 30c, and database review 30d is equal to 66. This implies that for the software application to be evaluated as conforming to the second performance maturity level 10, the software application should have full scores for all the sub-parameters under the aforementioned assessment parameters 30.

Similarly, the software application is evaluated to be at the third level, i.e., the optimized level 10c when the assessment parameters of testing 30e, gathered performance characteristics 30f, coding 30c, database review 30d, performance requirements 30a, and architecture and design review 30b should be equal to 95. This implies that for the software application to be evaluated as conforming to the third performance maturity level, the software application should have full scores for all the assessment parameters mentioned.

Likewise, for the software application to be evaluated at the fourth level, i.e., the leadership level 10d, the sum of assessment parameters of testing 30e, gathered performance characteristics 30f, coding 30c, database review 30d, performance requirements 30a, architecture and design review 30b, and performance benchmarking 30g should be 100

Referring now to Table 3, which is an extension of Table 2, based on the above described evaluation criteria, the performance maturity level 10 of the software application is evaluated as being of second level, i.e., oriented level 10b, since the software application satisfies the full score criteria of the assessment parameters of testing 30e and gathered performance characteristics 30f, which are pre-requisites for the first level, and the software application satisfies the full score criteria for the assessment parameters of testing 30e, gathered performance characteristics 30f, coding 30c, and database review 30d, which are pre-requisites for conforming to the second level

TABLE 3

| Level | Aggregate score | Level Criteria |
|---|---|---|
| L1 | 40 | L1 = (T plus GPC) = 40 |
| L2 | 66 | L2 = (L1 plus C plus D) = 66 |
| L3 | 87 | L3 = (L2 plus A plus R) = 95 |
| L4 | — | L4 = (L3 plus P) = 100 |
| Maturity Level | 66 | Level 2 |

Further, as mentioned previously, if the target maturity level was third level, and since in this case the software product did not meet the target maturity level, the maturity feedback module 218 can provide certain set of recommendations in order to improve the performance maturity, say related to architecture and design review, from a performance improving perspective so that the software application can achieve the next hierarchical level of maturity.

Figure 3:
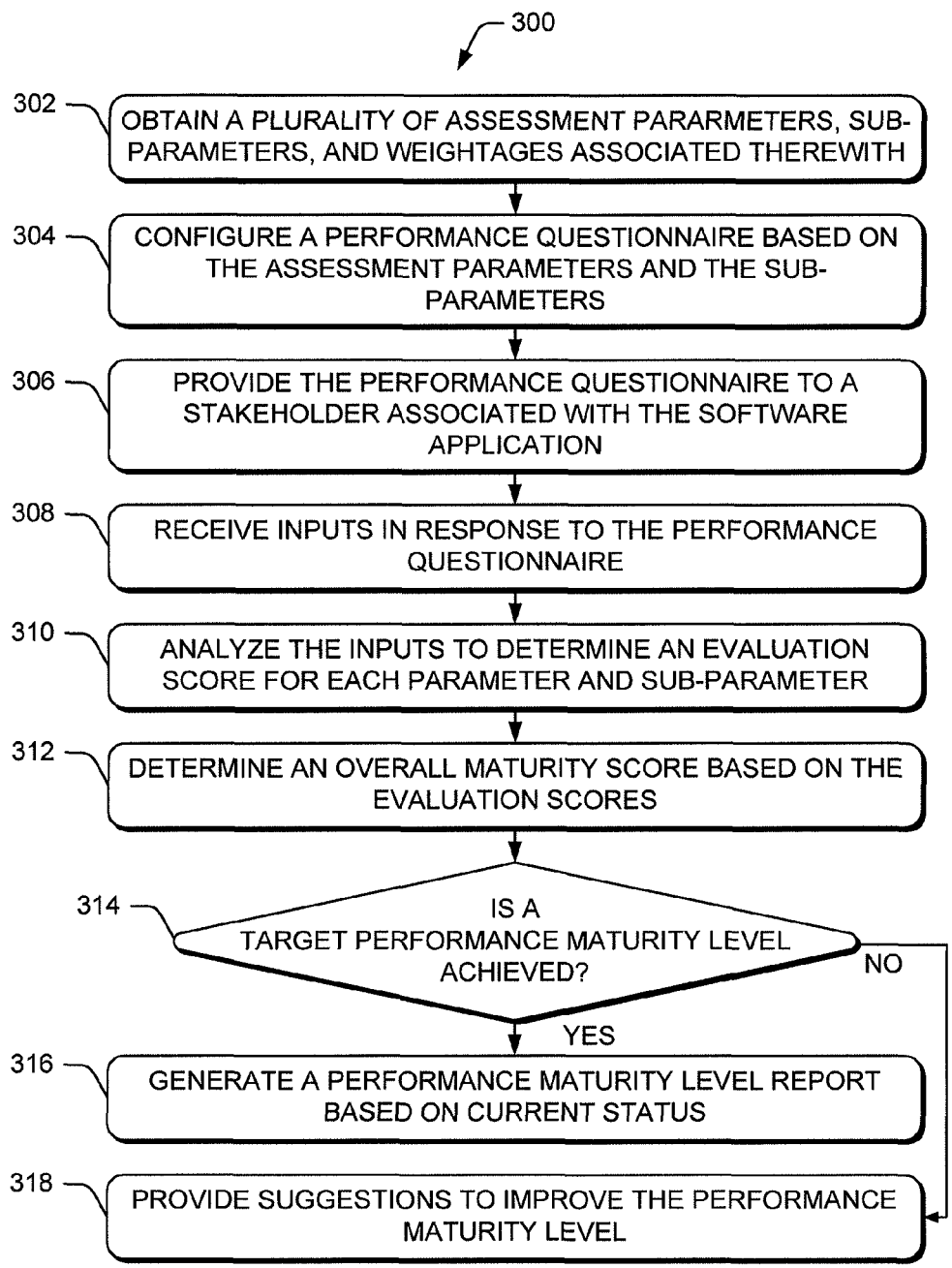
FIG. 3 illustrates a method for evaluating performance maturity level of an application, according to an implementation of the present subject matter.

FIG. 3 illustrates a method 300 for evaluating performance maturity level 10 of an application, according to an embodiment of the present subject matter. The order in which the method 300 is described is not intended to be construed as a limitation, and any number of the described method blocks can be combined in any order to implement the method 300, or alternative methods. Additionally, individual blocks may be deleted from the method 300 without departing from the spirit and scope of the subject matter described herein. Furthermore, the methods can be implemented in any suitable hardware, software, firmware, or combination thereof.

The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

With reference to the description of FIG. 3, for the sake of brevity, the details of the components of the various devices, such as the performance evaluation system 202 for evaluating performance maturity level 10 of an application, are not discussed in detail in the description of FIG. 3. Such details can be understood as provided in the description provided with reference to FIG. 2.

Referring to FIG. 3, at block 302, a plurality of assessment parameters 30 and sub-parameters are obtained, based on the software application. As mentioned previously, the assessment parameters 30 and the sub-parameters can be directly based on the key competency areas described previously. Further, according to an aspect, the assessment parameters 30 and the sub-parameters can be derived based on the key performance areas 20.

In addition, a weightage can be associated with each assessment parameter 30 and sub-parameter. In an implementation, the weightage can be associated with each assessment parameter and the sub-parameter, based on, for example, the significance or relevance of the respective assessment parameter 30 and sub-parameter. In another implementation, the weightage can be associated with each assessment parameter 30 and sub-parameter, based on the historical weightages associated with such assessment parameters 30, or can be provided by a user.

Further at block 304, once the assessment parameters 30 and the sub-parameters and their respective weightages have been obtained, a performance questionnaire can be configured, based on the obtained assessment parameters 30 and the sub-parameters. The performance questionnaire can be configured, in an implementation, by retrieving previously stored questions relevant to the obtained assessment parameters 30 and the sub-parameters.

At block 306, the performance questionnaire can be provided, say to a stake holder associated with the software application being checked for performance maturity. In an example, the stake holder can be administrator overseeing the operation of the software application on the client system 204, at the client end.

In addition, in certain cases, for example, in case the stake holder requests, an auxiliary questionnaire including questions relating to system performance can be configured. Such questions relating to system performance can include, for example, questions relating to CPU (central processing unit) utilization and memory utilization by the software application.

In an implementation, the performance questionnaire and the auxiliary questionnaire can include selectable answers, for example, provided in drop-down format. Accordingly, the stake holder, while responding to the questionnaires, can select one of the many options for each question.

Further at block 308, inputs in response to the performance questionnaire can be received, say from the stake holder. Subsequently, at block 310, the inputs or the responses can be analyzed to determine an evaluation score associated with each response for each assessment parameter 30 and sub-parameter. In an implementation, the analysis can include comparing the responses with previously stored responses and accordingly determining the evaluation score associated with each assessment parameter 30 and sub-parameter.

Further, once the evaluation scores associated with each response have been determined at block 310, at block 312 an overall maturity score for the software application, based on the evaluation scores of the individual responses and the weightage associated with each question can be determined. As will be understood that the weightage associated with each question correspond to the weightage associated with the assessment parameter 30 or sub-parameter to which the question relates. The maturity score of the software application can be indicative of the performance maturity level 10 of the software application.

In addition, a feedback on the maturity level of the software application can be provided. At block 314, it is determined whether a target maturity level for the software application is achieved or not. In case the target performance maturity level of the software application, say previously received from the stake holder, is met (YES path from block 314) then at block 316, a performance maturity report indicating the current status of performance maturity of the software application is generated and sent to the stake holder.

On the other hand, in case the target performance maturity level of the software application, is not met (NO path from block 314), then at block 318, suggestions for improving the performance maturity of the software application can be provided.

Although implementations for evaluating performance maturity level of an application have been described in language specific to structural features and/or methods, it is to be understood that the appended claims are not necessarily limited to the specific features or methods described. Rather, the specific features and methods are disclosed as implementations evaluating performance maturity level of an application.

We claim:

1. A computer implemented method for evaluating a performance maturity level of a software application, the method comprising:
   obtaining at least one assessment parameter and at least one sub-parameter of the at least one assessment parameter, based on at least one of a key performance area and a key competency area, wherein the key performance area is at least one of workload characterization, performance oriented architecture and design, code optimization, database tuning, and performance benchmarking, wherein the at least one assessment parameter comprises performance requirements, architecture and design review, coding, database review, testing, gathered performance characteristics, and performance benchmarking, and wherein the at least one sub-parameter is at least one of a code profiling check, code tuning check, a workload characterization check, a performance requirements gathered completely check, a SQL code being tuned check;
   assigning a weightage to the at least one sub-parameter, the weightage being based on significance of the at least one sub-parameter to the assessment parameter;
   configuring a performance questionnaire, based on the at least one assessment parameter and the at least one sub-parameter; and
   determining a maturity score for the software application, in response to inputs received to the performance questionnaire, wherein the determining is based on the weightage assigned to the at least one sub-parameter of the at least one assessment parameter, the maturity score being indicative of the performance maturity level of the software application;
   comparing the performance maturity level of the software application to a target performance maturity level; and
   providing suggestions for improving the performance maturity level of the software application, based on the comparison.

2. The computer implemented method claimed in claim 1, wherein the performance maturity level is at least one of a basic level, an oriented level, an optimized level, and a leadership level.

3. The computer implemented method of claim 1, wherein the determining the maturity score comprises: determining an evaluation score for the at least one sub-parameter, based on an evaluation rating of the at least one sub-parameter; and
ascertaining an evaluation score for the at least one assessment parameter, based on the evaluation score for the at least one sub-parameter and the weightage assigned to the at least one sub-parameter.

4. The computer implemented method as claimed in claim 3, wherein the evaluation rating of the at least one sub-parameter is one of 'meets the expectations', 'does not meet the expectations', and 'not applicable'.

5. The computer implemented method as claimed in claim 1, wherein the determining the maturity score comprises:
   ascertaining the performance maturity level associated with the at least one assessment parameter; and
   determining the performance maturity level of the software application based on an evaluation score for the at least one sub-parameter of the at least one assessment parameter.

6. The computer implemented method as claimed in claim 1, wherein the performance maturity level is determined based on the at least one assessment parameter.

7. A performance evaluation system for evaluating a performance maturity level of a software application, the performance evaluation system comprising: a processor;
   a questionnaire module coupled to the processor to:
      obtain at least one assessment parameter and at least one sub-parameter of the at least one assessment parameter, based on at least one of a key performance area and a key competency area, wherein the key performance area is at least one of workload characterization, performance oriented architecture and design, code optimization, database tuning, and performance benchmarking, wherein the at least one assessment parameter comprises performance requirements, architecture and design review, coding, database review, testing, gathered performance characteristics, and performance benchmarking, and wherein the at least one sub-parameter is at least one of a code profiling check, code tuning check, a workload characterization check, a performance requirements gathered completely check, a SQL code being tuned check;
      assign a weightage to the at least one sub-parameter, the weightage being based on significance of the at least one sub-parameter to the assessment parameter, and
      configure a performance questionnaire, based on the at least one assessment parameter and the at least one sub-parameter,
   a maturity evaluation module coupled to the processor to:
      determine a maturity score for the software application, in response to inputs received to the performance questionnaire, wherein the determining is based on the weightage assigned to the at least one sub-parameter of the at least one assessment parameter, the maturity score being indicative of the performance maturity level of the software application, and a maturity feedback module configured to:

compare the performance maturity level of the software application to a target performance maturity level, and provide suggestions for improving the performance maturity level of the software application, based on the comparison.

8. The performance evaluation system as claimed in claim 7, wherein the maturity evaluation module is further configured to: determine an evaluation score for the at least one sub-parameter, based on an evaluation rating of the at least one sub-parameter; and ascertain an evaluation score for the at least one assessment parameter, based on the evaluation score for the at least one sub-parameter and the weightage assigned to the at least one sub-parameter, for determining the maturity score for the software application.

9. The performance evaluation system as claimed in claim 7, wherein the maturity evaluation module is further configured to: determine the performance maturity level associated with the at least one assessment parameter; and ascertain the performance maturity level of the software application based on an evaluation score for the at least one sub-parameter of the at least one assessment parameter.

10. A non-transitory computer-readable medium having embodied thereon a computer program for executing a method comprising:

obtaining at least one assessment parameter and at least one sub-parameter of the at least one assessment parameter, based on at least one of a key performance area and a key competency area, wherein the key performance area is at least one of workload characterization, performance oriented architecture and design, code optimization, database tuning, and performance benchmarking, wherein the at least one assessment parameter comprises performance requirements, architecture and design review, coding, database review, testing, gathered performance characteristics, and performance benchmarking, and wherein the at least one sub-parameter is at least one of a code profiling check, code tuning check, a workload characterization check, a performance requirements gathered completely check, a SQL code being tuned check;

assigning a weightage to the at least one sub-parameter, the weightage being based on significance of the at least one sub-parameter to the assessment parameter;

configuring a performance questionnaire, based on the at least one assessment parameter and the at least one sub-parameter;

determining a maturity score for the software application, in response to inputs received to the performance questionnaire, wherein the determining is based on the weightage assigned to the at least one sub-parameter of the at least one assessment parameter, the maturity score being indicative of the performance maturity level of the software application;

comparing the performance maturity level of the software application to a target performance maturity level; and providing suggestions for improving the performance maturity level of the software application, based on the comparison.

* * * * *